(12) United States Patent
Li

(10) Patent No.: US 6,331,997 B1
(45) Date of Patent: Dec. 18, 2001

(54) SCHEME FOR SPREAD SPECTRUM MULTIPLE ACCESS CODING

(75) Inventor: Daoben Li, Beijing (CN)

(73) Assignee: Linkair Communication, Inc., San Jose, CA (US)

(*) Notice: Subject to any disclaimer, the term of this patent is extended or adjusted under 35 U.S.C. 154(b) by 0 days.

(21) Appl. No.: 09/501,666

(22) Filed: Feb. 10, 2000

Related U.S. Application Data

(63) Continuation of application No. PCT/CN98/00151, filed on Aug. 4, 1998.

(51) Int. Cl.[7] .............................. H04L 27/30; H04K 1/30; H04B 15/00
(52) U.S. Cl. ......................... 375/130; 375/200; 375/206
(58) Field of Search ................................. 375/130, 200, 375/207, 206

(56) References Cited

U.S. PATENT DOCUMENTS

| | | | |
|---|---|---|---|
| 5,065,629 | * 11/1991 | Koike et al. ............................ | 73/602 |
| 5,151,702 | * 9/1992 | Urkowitz ............................... | 342/134 |
| 5,230,076 | * 7/1993 | Wilkinson ............................. | 455/62 |
| 5,596,601 | * 1/1997 | Bar-David ............................. | 375/200 |
| 5,610,907 | * 3/1997 | Barrett .................................. | 370/342 |
| 5,623,511 | * 4/1997 | Bar-David et al. .................... | 375/207 |
| 5,712,871 | * 1/1998 | Chang ................................... | 375/206 |
| 6,115,411 | * 9/2000 | Van Driest ............................ | 375/200 |

OTHER PUBLICATIONS

Spread Spectrum Pulse Modulation and its Asynchronous CDMA Performance–A Simple Approach for Shanno's Limit__. Isao Okazaki, and Takaaki Hasegawa, I.E.E.E. 1992, pp. 325–328.*

1–Sixty–Phase Barker Sequences, Ning Zhang, and S. w. Golomb, I.E.E.E. 1989, pp. 911–912.*

2–A Limit Theorem for n–Phase Barker Sequence, Ning Zhang, and S.W. Golomb, I.E.E.E. 1990, pp. 863–866.*

1–A Class of Pseudonoise–Like Pulse Compression Codes, Stephen R. Gottesman, Philip G. Grieve, and Solomon W. Golomb, I.E.E.E. 1992, pp. 355–362.*

2–Two–Valued sequences with Perfect Periodic Autocorrelation, Solomon W. Golomb, i.E.E.E. 1992, pp. 383–.*

\* cited by examiner

*Primary Examiner*—Stephen Chin
*Assistant Examiner*—Tony Al-Beshrawi
(74) *Attorney, Agent, or Firm*—Trop, Pruner & Hu, P.C.

(57) ABSTRACT

This invention publishes a spread spectrum multiple access coding technique applied in any wireless digital telecommunication system involving Code Division Multiple Access and spread spectrum technique. The group of basic pulses has normalized amplitudes and duration of 1 and polarity; the number of basic pulses is ascertained by practical factors; there is no equal interval between basic pulses on time axis, and asymmetry of pulses' positions is employed to achieve arranging coding. This coding scheme can control and minimize the side lobes of auto-correlation and cross-correlation functions, then simplify the design of a CDMA system, so a wireless digital telecommunication system with large capacity can be established effectively to solve the contradiction between ever increasing demand for telecommunication capacity and limited frequency resources.

15 Claims, 4 Drawing Sheets

SCHEME FOR SPREAD SPECTRUM MULTIPLE ACCESS CODING

This application is a continuation of PCT/CN98/00151 filed Aug. 4, 1998.

FIELD OF THE INVENTION

The invention relates to a spread spectrum and digital multiple access wireless communications scheme, especially to a spread spectrum multiple access coding scheme applied in any digital communications system employing code division multiple access ("CDMA") and spread spectrum radio.

BACKGROUND OF THE INVENTION

With the coming of the information society and the personal communications era, the demand on wireless communications technology is growing rapidly, but the frequency resources are very limited. A code division multiple access ("CDMA") technique is the only efficient way to resolve the contradiction between limited frequency resources and demand for high capacity. The capacity of traditional wireless multiple access techniques, e.g., frequency division multiple access ("FDMA") and time division multiple access ("TDMA"), is fixed once designed, i.e., additional users can not be introduced beyond that capacity limit. But CDMA is different in that the capacity is only limited by the interference level and thus results in the advantages of large capacity and soft capacity. That is, introducing an additional user is not precluded even though it may lead to reduced signal-to-noise ratio and quality of communications. So, unlike FDMA or TDMA, an insurmountable capacity limit does not exist.

As is noted above, the capacity of a CDMA system is interference-limited, thus, whether the interference level can be controlled or not determines the system's quality. Generally, the interference in the system consists of four parts: the first is local noise, which may be reduced by applying a low noise amplifier; the second is multiple access interference ("MAI"), which comes from the other users in the system; the third is inter-code or inter-symbol interference ("ISI"); and the fourth is neighboring cell or adjacent channel interference ("ACI"). By employing well-designed multiple access codes, MAI, ISI and ACI can be reduced or even eliminated.

In any CDMA system, each user has a specific spread spectrum multiple access code for identification. Furthermore, to reduce the users' mutual interference, the spread spectrum multiple access codes must be orthogonal to each other. Indeed, orthogonality between any two users' signals is always required in any multiple access system. Given that the channel is an ideal linear time-invariant system, and accurate synchronization is realized in the system, then orthogonality between any two users' signals can be achieved. Unfortunately, there is no such ideal channel in practice. Besides, it is quite difficult to maintain strict synchronization. That is why it is important to employ a good multiple access technique. As for a CDMA technique, well designed multiple access codes are the root of the system.

It is known that the wireless channel is a typical random time-varying channel, in which there exists not only random frequency dispersion (Doppler frequency shift) but also random time dispersion (multi-path propagation). The former introduces time selective fading to the received signals, i.e., the received signal's frequency varies randomly with time. The latter introduces frequency selective fading to the received signals, i.e. different frequency spectrum components of the received signal vary differently with time. The fading deteriorates the system's performance seriously and at the same time, reduces the system's capacity. This is especially true for the channel's time dispersion, which is caused by multi-path propagation: it prevents signals from arriving simultaneously, so ISI and MAI are caused and the system's capacity is drastically reduced. When the relative time delay between signals is zero, it is quite easy to achieve orthogonality between signals, indeed any orthogonal codes can meet that requirement, but when the relative delay between signals is non-zero, it becomes very difficult to do so. In fact, it has been proven that there are no such spread spectrum multiple access codes in binary, finite and even complex number spaces. In particular, MAI and ISI contradict one another so that smaller MAI leads to larger ISI and vice versa.

Therefore, the distinction between different CDMA systems lies mainly in the selected multiple access codes, i.e. in a good system, ISI and MAI must both be small, otherwise they must be larger.

Existing CDMA systems have either very low efficiency or have very short communications distance for example about several hundred meters or do nothing to MAI and ISI and then all that can be done is to alleviate them by using relatively good multiple access codes.

SUMMARY OF THE INVENTION

The aim of the invention is to present a new, simpler, clearer and faster design scheme of spread spectrum multiple access codes. Based on the scheme, both MAI and ISI in the corresponding CDMA system can be controlled and thus a digital wireless communications system with large capacity can be constructed.

Ideal spread spectrum multiple access codes should satisfy the two main conditions below:

First, each code's auto-correlation function should be an ideal impulse function, i.e. the function should be zero everywhere except at the origin. From the view of orthogonality, each code should be orthogonal to its own relative time delay version unless the relative time delay is zero;

Second, the cross-correlation function between any two codes should be zero everywhere. From the view of orthogonality, each code should be orthogonal to all the other codes with any relative time delay (including the zero delay).

To elaborate, we denote the auto-correlation values at the origin as the main-lobe value, while the auto-correlation values not at the origin, as well as the cross-correlation values are denoted as side-lobe values. For an ideal CDMA system, the side-lobe values of all the auto-correlations and cross-correlations should be zero. For a practical system, however, it is impossible to satisfy that condition. In this case, all that can be done is to try to make the values of the side-lobes as small as possible (or the main-lobe to side-lobe value ratio as large as possible) and the number of the side-lobes as few as possible. As for binary codes, the smallest non-zero side-lobe's value must be +1 or −1.

Therefore, in some embodiments of the present invention a spread spectrum multiple access coding scheme controls and reduces the side-lobes' values of the auto-correlations and cross-correlations.

In addition, a random access asynchronous communications system in which all the user stations, clocks are not controlled by base station is desirable because of its simplicity. That system, on the other hand, has a very strict requirement on the spread spectrum multiple access codes' characteristic. So, some embodiments of the present invention give an effective and practical method for such a random access asynchronous digital communications system.

The spread spectrum multiple access codes mentioned here are composed of basic pulses with normalized "1" amplitude and width and different polarities. The number of the basic pulses is determined according to such practical factors such as the number of required users, the number of available pulse compressing codes, the number of available orthogonal pulse compressing codes, the number of available orthogonal frequencies, system bandwidth, the system's highest transmission rate, etc. The intervals between the basic pulses on the time axis are all unequal and the basic pulses' positions on it are all different, which are both considered together with the basic pulses' polarities when coding.

Of all the values of the basic pulses' intervals mentioned above, only one is an odd number larger than the smallest interval's value, i.e. the coding length is odd, while the rest intervals' values are all even. Moreover, any interval's value can not be the sum of any other two or more interval values.

According to orthogonality, the spread spectrum multiple access codes mentioned above are sorted into different code groups, in which the polarities of the basic pulses are determined by the orthogonality requirement and the sequence is sorted according to Hadamard or other orthogonal matrices, or some kind of bi-orthogonal or trans-orthogonal matrix.

The above coding method is a new CDMA spread spectrum multiple access coding scheme for a Large Area Asynchronous Wireless Communications System or Large Area Synchronous Wireless Communications System, and the code groups are named LA-CDMA codes. When doing correlation, whether it is auto-correlation or cross-correlation, and whether it is periodic correlation, or non-periodic correlation, or even mixed correlation, no two or more basic pulses can meet together besides at the origin, which ensures that the side-lobes' values are at most +1 or −1. Furthermore, there exists a zero correlation window beside the origin and the main-lobe's value equals the number of basic pulses. Therefore, the side-lobes of the auto-correlations and cross-correlations are controlled and reduced. That is, in the corresponding CDMA system, both MAI and ISI are controlled, and an ideal CDMA system without MAI and ISI can also be realized if the zero correlation window is utilized.

The above principles lead to a new simpler, clearer and faster design scheme of spread spectrum multiple access codes for spread spectrum technology and digital multiple access technology. Based on the scheme, a CDMA system's design can be simplified and large capacity achieved, so as to solve the contradiction between the growing need for high capacity and the limited frequency resources.

Because the side-lobes of the correlations are small and smooth, MAI and ISI are unrelated to the users' access time and thus random access is permitted. Further, as long as the stability of the clocks in the user stations' transceivers meets a specific requirement, an asynchronous mode is also permitted.

In a practical design, to increase the code's duty ratio, the above mentioned basic pulse can also be formed by pulse compressing codes, which are composed of one or more binary or m-ary sequences, including frequency modulated sequences, or frequency and phase jointly modulated sequences, or frequency, phase and time jointly modulated sequences, etc.

In order to raise the transmission data rate or reduce frequency band-width, or increase the number of multiple access codes number, the codes can also be time offset and overlapped, where the shift interval should be larger than the channel's maximum time dispersion (the maximum multi-path time delay difference). In the case that the shift interval is smaller than the channel's maximum time dispersion, the shifted version should be modulated by different orthogonal frequencies.

In order to raise the code's duty ratio and transmission data rate simultaneously as much as possible, both of the above methods can be combined, i. e. the basic pulse is composed of pulse compressing codes (including one or more binary or m-ary sequences, or frequency modulated sequences, or frequency and phase jointly modulated sequences, or frequency, phase and time jointly modulated sequences, etc. ). At the same time, the codes are time offset and overlapped.

To further increase the number of multiple access codes, the above mentioned basic pulse can also be formed by orthogonal pulse compressing codes (including one or more binary or m-ary sequences, or frequency modulated sequences, or frequency and phase jointly modulated sequences, or frequency, phase and time jointly modulated sequences, etc), or the above mentioned basic pulses can be modulated by different orthogonal frequencies.

DETAILED DESCRIPTION

An explanation of the invention with the attached figures is presented below.

Figure 1:
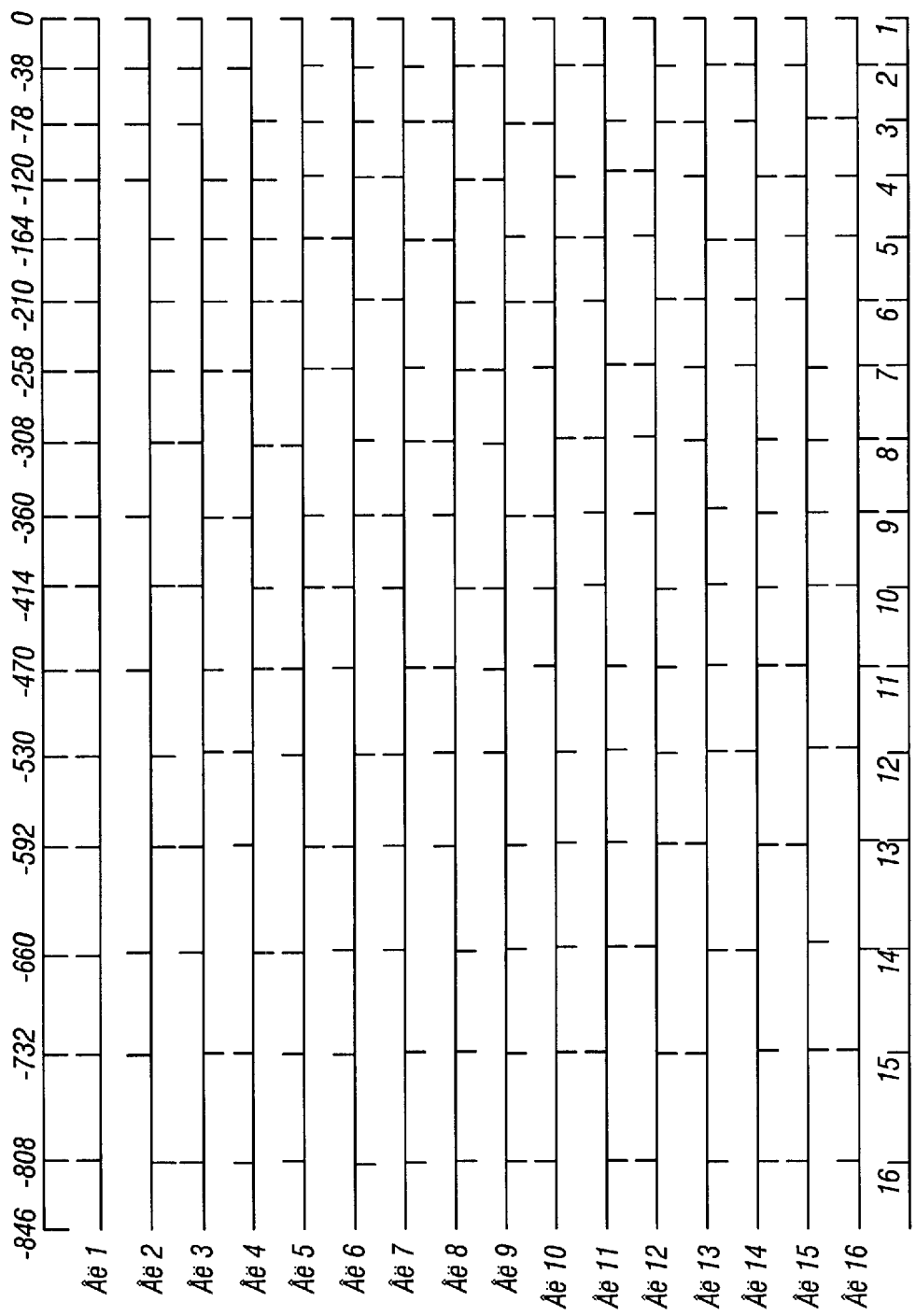
FIG. 1 illustrates an example of LA-CDMA code groups (with 16 codes) mentioned in the paper.

FIG. 1 is a simple LA-CDMA orthogonal code group including 16 access code words that can be used by 16 users simultaneously. Each code word consists of 16 "±" basic pulses. The period of this code group is 847. The intervals between pulses are respectively: 38, 40, 42, 44, 46, 48, 50, 52, 54, 56, 60, 62, 68, 72, 76 and 39. The polrities of the pulses ensure orthogonality between the codes.

Figure 2:
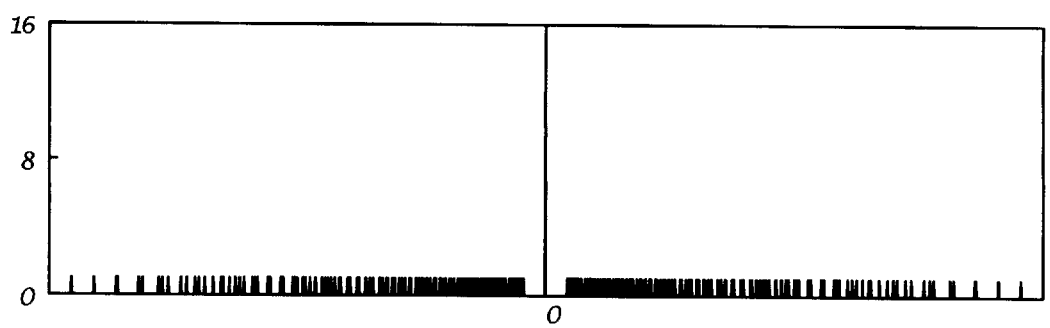
FIG. 2 is an illustration of the non-periodic auto-correlation function mentioned in the paper (for code 1 in FIG. 1).
Figure 3:
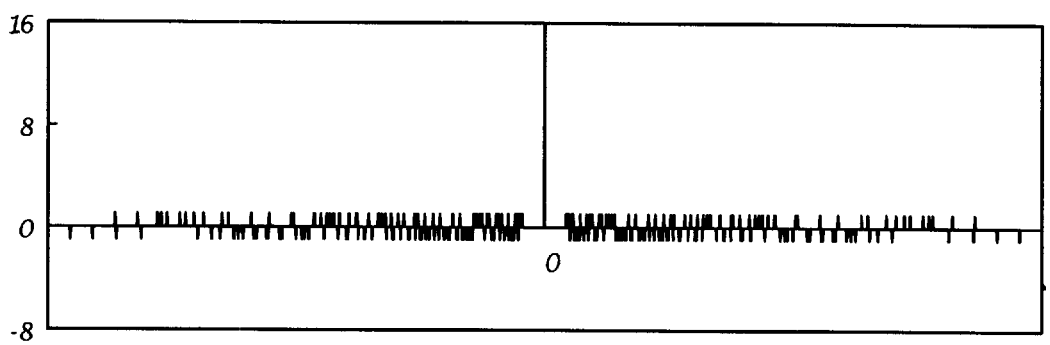
FIG. 3 is an illustration of the non-periodic auto-correlation function mentioned in the paper (for code 2 in FIG. 1).

FIG. 2 and FIG. 3 are non-cyclic auto-correlation curves for code 1 and code 2 in FIG. 1 respectively. Cross-correlation functions between other pairs of codes have quite similar shapes so that side lobes may equal a value chosen from +1, −1 or 0.

The correlation functions of any other LA-CDMA codes have quite similar shapes, and the only possible difference lies in polarities and positions of side lobes. The features of this code are described as follows:

1) Main lobe value of auto-correlation function equals the number of basic pulses, and also equals the number of orthogonal code words in the code group.
2) There are only three possible values of side lobes in the auto-correlation and cross-correlation function: +1, −1 or 0.
3) A zero correlation window in the auto-correlation and cross-correlation function or around the origin exists, and its magnitude is equal to 1 plus two times of the minimal interval between basic pulses.

So it can be concluded that the LA-CDMA code group tha is designed according to this invention can control and in some embodiments minimize the side lobes of the auto-correlation and cross-correlation function. This enables the CDMA system to control and minimize MAI and ISI simultaneously.

Table 1 and Table 2 below respectively list minimum periods of LA-CDMA codes of 16 basic pulses and 32 basic pulses under the conditions of various minimal basic pulse intervals, in order to make it convenient for choosing.

TABLE 1

Periods and minimum intervals of 16-pulse LA-CDMA codes

| minimum interval | minimum period | Minimum Interval | minimum period | minimum interval | minimum period | minimum interval | minimum period |
|---|---|---|---|---|---|---|---|
| 38 | 847 | 40 | 897 | 42 | 905 | 44 | 923 |
| 46 | 959 | 48 | 995 | 50 | 1065 | 52 | 1049 |
| 54 | 1081 | 56 | 1117 | 58 | 1145 | 60 | 1179 |
| 62 | 1213 | 64 | 1247 | 66 | 1269 | 68 | 1303 |
| 70 | 1337 | 72 | 1379 | 74 | 1395 | 76 | 1427 |
| 78 | 1461 | 80 | 1495 | 82 | 1529 | 84 | 1563 |
| 86 | 1587 | 88 | 1619 | 90 | 1653 | 92 | 1683 |
| 94 | 1715 | 96 | 1749 | 98 | 1783 | 100 | 1811 |
| 102 | 1843 | 104 | 1875 | 106 | 1907 | 108 | 1939 |
| 110 | 1971 | 112 | 2003 | 114 | 2035 | 116 | 2067 |
| 118 | 2099 | 120 | 2131 | 122 | 2163 | 124 | 2195 |
| 126 | 2227 | 128 | 2259 | 130 | 2291 | 132 | 2323 |
| 134 | 2355 | 136 | 2387 | 138 | 2419 | 140 | 2451 |
| 142 | 2483 | 144 | 2515 | 146 | 2547 | 148 | 2579 |
| 150 | 2611 | 152 | 2643 | 154 | 2675 | 156 | 2707 |
| 158 | 2739 | 160 | 2771 | 162 | 2803 | 164 | 2835 |
| 166 | 2867 | 168 | 2899 | 170 | 2931 | 172 | 2963 |
| 174 | 2995 | 176 | 3027 | 178 | 3059 | 180 | 3091 |
| 182 | 3123 | 184 | 3155 | 186 | 3187 | 188 | 3219 |
| 190 | 3251 | 192 | 3283 | 194 | 3315 | 196 | 3347 |
| 198 | 3379 | 200 | 3411 | 202 | 3443 | 204 | 3475 |
| 206 | 3507 | 208 | 3539 | 210 | 3571 | 212 | 3603 |
| 214 | 3635 | 216 | 3667 | 218 | 3699 | 220 | 3731 |
| 222 | 3763 | 224 | 3795 | 226 | 3827 | 228 | 3859 |
| 230 | 3891 | 232 | 3923 | 234 | 3955 | 236 | 3987 |
| 238 | 4019 | 240 | 4051 | 242 | 4083 | 244 | 4115 |
| 246 | 4147 | 248 | 4179 | 250 | 4211 | 252 | 4243 |
| 254 | 4275 | 256 | 4307 | | | | |

TABLE 2

Periods and minimum intervals of 32-pulse LA-CDMA codes

| minimum interval | minimum period | minimum interval | minimum period | minimum interval | minimum period | minimum interval | minimum period |
|---|---|---|---|---|---|---|---|
| 32 | 4751 | 34 | 4465 | 36 | 4447 | 38 | 4489 |
| 40 | 4745 | 42 | 4847 | 44 | 4889 | 46 | 5359 |
| 48 | 4699 | 50 | 5225 | 52 | 5125 | 54 | 5117 |
| 56 | 5315 | 58 | 4725 | 60 | 4687 | 62 | 4765 |
| 64 | 4423 | 66 | 5115 | 68 | 5059 | 70 | 5307 |
| 72 | 5299 | 74 | 5617 | 76 | 4955 | 78 | 5133 |
| 80 | 4915 | 82 | 5397 | 84 | 5499 | 86 | 4965 |
| 88 | 5291 | 90 | 5223 | 92 | 4837 | 94 | 5539 |
| 96 | 5889 | 98 | 5373 | 100 | 5319 | 102 | 5051 |
| 104 | 5331 | 106 | 5617 | 108 | 5991 | 110 | 5109 |

TABLE 2-continued

Periods and minimum intervals of 32-pulse LA-CDMA codes

| minimum interval | minimum period | minimum interval | minimum period | minimum interval | minimum period | minimum interval | minimum period |
|---|---|---|---|---|---|---|---|
| 112 | 5347 | 114 | 5383 | 116 | 5127 | 118 | 4883 |
| 120 | 5211 | 122 | 5429 | 124 | 5737 | 126 | 5663 |
| 128 | 5725 | 130 | 5623 | 132 | 5725 | 134 | 5497 |
| 136 | 5323 | 138 | 5393 | 140 | 5465 | 142 | 5811 |
| 144 | 5959 | 146 | 5893 | 148 | 6331 | 150 | 6355 |
| 152 | 5943 | 154 | 6053 | 156 | 6075 | 158 | 6241 |
| 160 | 6425 | 162 | 6475 | 164 | 6267 | 166 | 6399 |
| 168 | 6517 | 170 | 6435 | 172 | 6491 | 174 | 6555 |
| 176 | 6631 | 178 | 6665 | 180 | 6751 | 182 | 6835 |
| 184 | 6839 | 186 | 6903 | 188 | 6971 | 190 | 7059 |
| 192 | 7121 | 194 | 7295 | 196 | 7521 | 198 | 7351 |
| 200 | 7543 | 202 | 7427 | 204 | 7521 | 206 | 7579 |
| 208 | 7629 | 210 | 7689 | 212 | 7739 | 214 | 7807 |
| 216 | 7875 | 218 | 7953 | 220 | 8031 | 222 | 8051 |
| 224 | 8119 | 226 | 8173 | 228 | 8239 | 230 | 8307 |
| 232 | 8375 | 234 | 8443 | 236 | 8499 | 238 | 8569 |
| 240 | 8641 | 242 | 8743 | 244 | 8747 | 246 | 8813 |
| 248 | 8881 | 250 | 8949 | 252 | 9011 | 254 | 9113 |
| 256 | 9173 | | | | | | |

Figure 6:
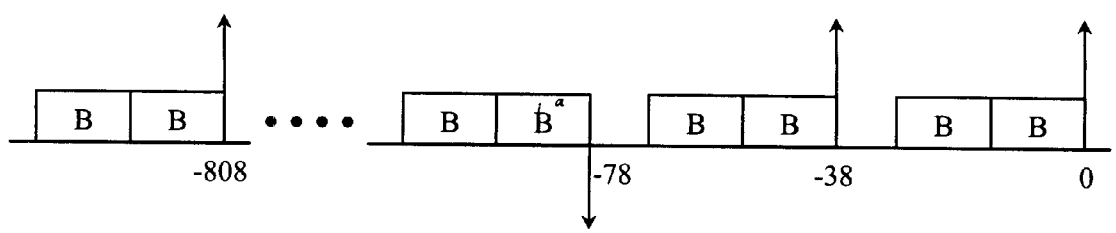
FIG. 6 shows the LA-CDMA codes formed by the relative coding pulse compressing method mentioned in the paper.

Pulse duty ratio for basic the LA-CDMA code is very low. For example, FIG. 1 shows that pulse duty ratio of a 16 basic pulse code with period of 847 is merely 16/847 (=0.0189). To increase the duty ratio in a practical design, any pulse compression codes with good performance such as a Barker sequence or linear frequency modulation code are usable to substitute for each single pulse in the basic code. In this way, as long as the received signal passes through a matched filter matched to this pulse compression code in advance, the output is the required LA-CDMA code. Several solutions for increasing pulse duty ratio included in this invention are described below:

Forming an LA-CDMA code by a relative encoding pulse compression method is shown in FIG. 6. A positive pulse in the basic LA-CDMA code is generated by two consecutive pulse compression code "B"s with the same polarity, whereas a negative pulse is generated by a positive and a negative pulse compression code "B". For instance, considering a 16-pulse LA-CDMA code with a period of 847, if a 13-bit Barker sequence is chosen for the pulse compression code, then the duty ratio of the code will rise to 16×26/847 (=0.4911).

Figure 7:
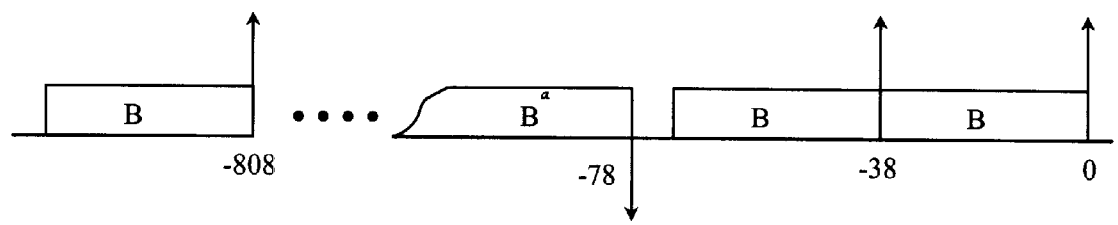
FIG. 7 shows the LA-CDMA codes formed by the absolute coding pulse compressing method mentioned in the paper.

Forming an LA-CDMA code by an absolute encoding pulse compression method is shown in FIG. 7. A positive pulse in the basic LA-CDMA code is generated by a pulse compression code "B", whereas a negative pulse is generated by an inverse (i.e. an inverted polarity "B") of the pulse compression code. For instance, still considering a 16-pulse LA-CDMA code with a period of 847, if a 28-bit pulse compression code is chosen to form a single pulse, then the duty ratio will rise to 16×28/847 (=0.5289); if a 38-bit pulse compression code is chosen to form a single pulse, then the duty ratio will rise to 16×38/847 (=0.7178).

Figure 8:
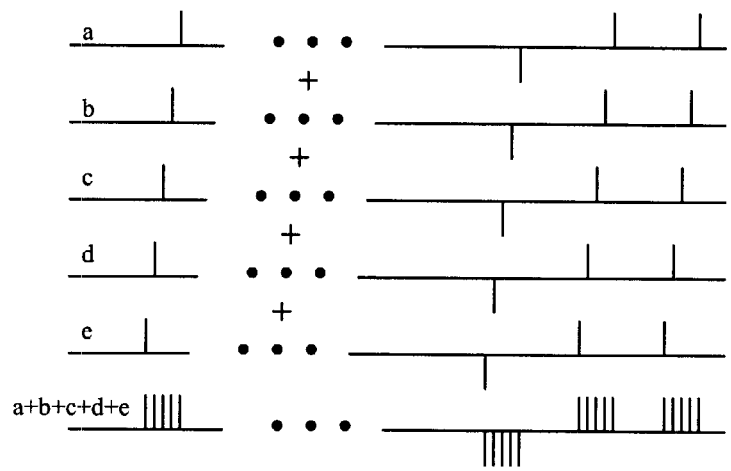
FIG. 8 shows the time offsetting and overlapping method to raise the code's duty ratio mentioned in the paper.

Adopting a time-offset overlapped method for increasing the duty ratio is illustrated in FIG. 8, where "a" is the primitive code, "b", "c", "d" and "e" are shifted code versions after four shifts respectively, and "a+b+c+d+e" is a time-offset overlapped code. It should be noted that the time-offset value must be greater than the time dispersion range of the channel; otherwise, either adding a partial response equalizer to the receiver in order to reduce time dispersion range of channel, or adopting various orthogonal frequencies for the time-offset versions smaller than the time dispersion range of the channel, should be employed. When synchronization techniques are adopted, it is similar to a TDMA technique in that different shift versions can be used by different users. Therefore, this can increase the number of orthogonal codes greatly. In a random access system, each shifted version of the LA-CDMA code can only be used by one user, but that method can increase the user's data rate enormously without expanding system bandwidth, or can decrease system bandwidth while retaining a given data rate.

Clearly, the time-offset overlapped pulse compression method can also be employed, which is a mixture of method 1 and method 2, or a mixture of method 2 and method 3, and further details are not needed. This method can provide the greatest increase in pulse duty ratio and information rate simultaneously (or decrease system bandwidth with data rate unaffected).

Sometimes it is inconvenient that the maximum number of users offered by the basic LA-CDMA code is determined only by the quantity of basic pulses, since the more orthogonal codes in the code group, the better. Embodiments of this invention may provide three solutions to enlarge the number of users.

The first solution is to adopt orthogonal pulse compression codes. If M pieces of orthogonal pulse compression codes can be found, then MXN orthogonal pulse compression code words can be obtained when there are N pulses in an LA-CDMA code. For example, considering a 16-pulse LA-CDMA code with a period of 847 and choosing a 32-bit orthogonal code as its pulse compression code, as there are 32 orthogonal codes in the 32-bit orthogonal pulse compression code group, there are a total of 16×32 (=512) orthogonal code words.

The second solution is to adopt orthogonal frequencies. The simplest implementation is to utilize a general purpose FDMA/CDMA mixed technique. In this way, if M kinds of orthogonal frequencies are employed (in which intervals of frequencies are multiples of 1/T, here T is the duration of a pulse in the LA-CDMA code), then MXN orthogonal code words can be obtained when there are N pulses in the LA-CDMA code. Introducing different orthogonal frequencies to different pulses in the LA-CDMA code, especially when the pulse compression method is employed, the finally acquired code is a compound code of the basic LA-CDMA code and the chosen pulse compression code. According to compound encoding theory, the property of a compound code is mainly determined by the code with worse performance of two elements of the compound code. Thus, when a pulse compression code is chosen poorly, the final properties of the auto-correlation and cross-correlation function will worsen. When every pulse is "isolated" by orthogonal frequencies, the pulse compression code will be "isolated" too, minimizing degradation accordingly and increasing room for choices greatly. For instance, still considering a 16-pulse LA-CDMA code with a period of 847, when 16 orthogonal frequencies are introduced and a 32-bit orthogonal code serves as the pulse compression code, a total of 16×16×32 (=8192) orthogonal code words are obtained.

The third solution is to relax the restriction of orthogonality, i. e. to adopt quasi-orthogonality which uses imperfect orthogonal codes, to increase the number of users. For example, considering an LA-CDMA code with N pulses, as the order of N basic intervals has no affect on its auto-correlation and cross-correlation functions, it can be arbitrary. When a code group with various orders of basic intervals is exploited at the same time, the number of users will increase enormously. This can also serve as a solution for reducing interference of adjacent service areas or channels.

Figure 9:
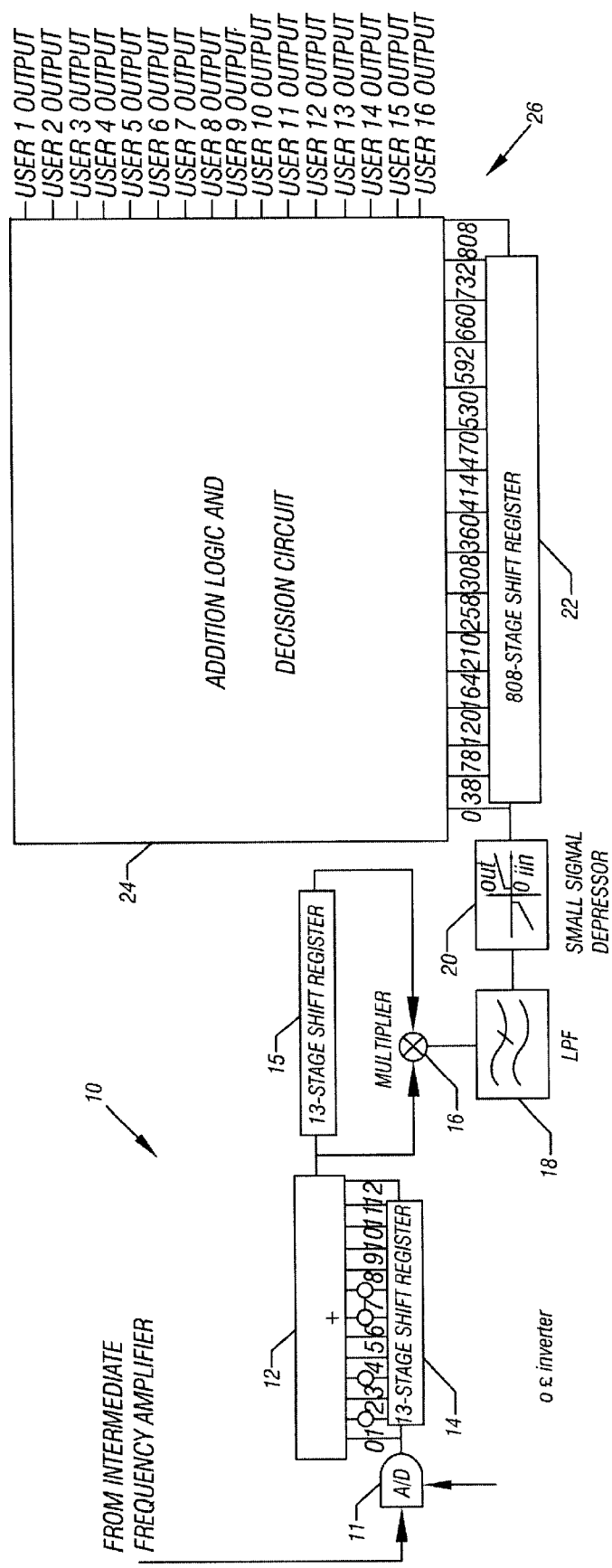
FIG. 9 shows a diagram of a class of receiver.

FIG. 9 is a block diagram of a receiver 10 for a LA-CDMA random access code division multiple access wireless system exploiting one embodiment of this invention. This system adopts 16-pulse LA-CDMA codes and 4 orthogonal frequencies, and can accommodate 64 users signaling simultaneously. The basic structures of a transmitter and a receiver may be readily ascertained once the information basic formula and modulation mode are decided. Of course, detailed implementations may entail some modification according to practical situations. For example, a receiver can be realized either by a matched filter or by a correlator. They both implement correlation operations, and have no distinction essentially. In these cases, a transmitter must generate required modulated waveforms that can be demodulated by computation. Generally, the receiver's structure is comparatively simple, such that a wireless telecommunication engineer can design it in the light of basic modulated signal waveform.

The 16-pulse LA-CDMA code with a period of 847 shown in FIG. 1 is adopted as a multiple access code in this system. Moreover, it utilizes 4 orthogonal frequencies, and each frequency's interval is the reciprocal of the basic pulse's duration. A relative coding pulse compression method is employed to generate the basic LA-CDMA code, with modulation performed using binary phase-shift keying ("BPSK"), and with a pulse compression code of a 13-bit Barker sequence, which is 1 1 1 1 1 −1 −1 1 1 −1 1 −1 1.

Users are permitted to transmit using random access, and to receive by a matched filter. The figure depicts a receiver's block diagram for a certain orthogonal frequency. An analog signal from an intermediate frequency amplifier is converted to a digital signal by an analog to digital converter 11. The system 10 detects a 13-bit Barker sequence using a pulse shape matched filter 12 that includes a 13-bit digital tap delay line 14, multipliers 16 with a 13-bit stage shift register 15, a low pass filter 18 and a weak signal rejector or small signal depressor 20. An 808-bit digital tap delay line 22 and an additional logic circuit 24, which is another part of the receiver, form a pulse position matched filter 26.

The pulse shape matched filter 26 forms pulses of the basic LA-CDMA code, while the pulse position matched filter implements a match operation on the LA-CDMA code. A pulse position matched filter can implement match operations on 16 orthogonal LA-CDMA code simultaneously.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   generating a plurality of pulses having polarity and a plurality of different time intervals between successive pulses;
   generating a plurality of codewords from the plurality of pulses using the polarity of each pulse;
   generating codewords such that a cross-correlation between any two codewords in the plurality of codewords has side lobes that have the values of zero, positive amplitude squared, and minus amplitude squared;
   generating codewords that have a zero correlation window in an auto-correlation function; and
   wherein the cross-correlation function has a magnitude equal to the amplitude squared and wherein a width of the zero correlation window equals to two times the shortest interval of the plurality of intervals.

2. The method of claim 1 including generating a set of spread-spectrum multiple access codes using a large-area code-division-multiple-access system.

3. The method of claim 1 wherein generating a plurality of pulses includes generating a plurality of pulses such that each interval between the plurality of pulses is unequal in interval time to the intervals between the other pulses.

4. The method of claim 1 wherein generating a plurality of pulses includes generating one time interval that is an odd number larger than the time of the shortest interval.

5. The method of claim 1 wherein generating a plurality of codewords includes causing each codeword to be different from the other codewords by assigning for each respective codeword a polarity to each pulse in the plurality of pulses.

6. The method of claim 1 including generating codewords that are orthogonal.

7. The method of claim 1 including generating codewords that are bi-orthogonal.

8. The method of claim 1 including generating codewords that are trans-orthogonal.

9. The method of claim 1 including spread-spectrum processing each pulse by a pulse compression code.

10. The method of claim 1 including spread-spectrum processing each pulse by a Barker sequence.

11. The method of claim 1 including spread-spectrum processing each pulse by linear frequency modulation.

12. The method of claim 11 further including time offsetting and overlapping each said codeword in the plurality of codewords.

13. The method of claim 1 further including using different orthogonal modulating frequencies for a plurality of time off-set codewords in the plurality of codewords.

14. A method comprising:
   generating a plurality of pulses having polarity and a plurality of different time intervals between successive pulses;
   generating a plurality of codewords from the plurality of pulses using the polarity of each pulse, and spread-spectrum processing each pulse by a pulse compression code.

15. A method comprising:

generating a plurality of pulses having polarity and a plurality of different time intervals between successive pulses;

spread-spectrum processing each pulse by a pulse compression code;

generating a plurality of codewords from the plurality of pulses using the polarity of each pulse; and time off-setting and overlapping each said codeword in the plurality of codewords.

* * * * *

UNITED STATES PATENT AND TRADEMARK OFFICE
CERTIFICATE OF CORRECTION

PATENT NO. : 6,331,997 B1
DATED : December 18, 2001
INVENTOR(S) : Daoben Li

Figure 4:
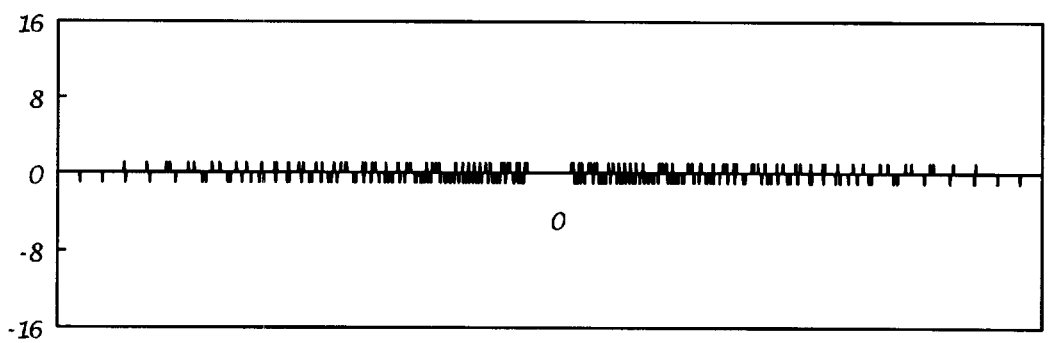
FIG. 4 is an illustration of the non-periodic cross-correlation function mentioned in the paper (for code 1 and code 2 in FIG. 1).
Figure 5:
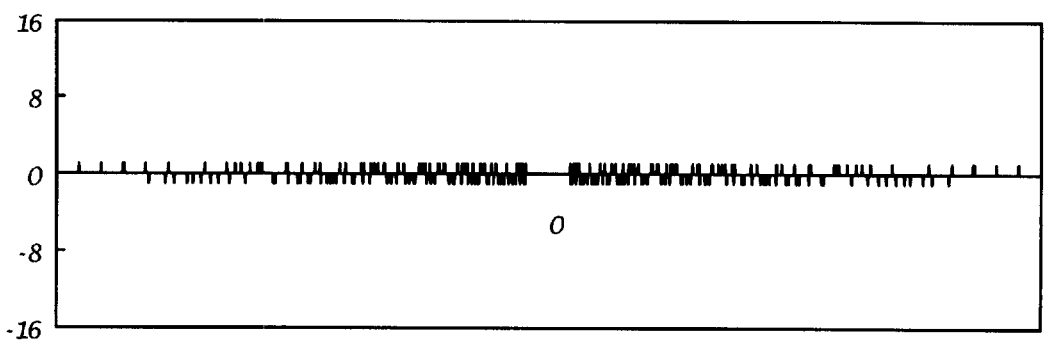
FIG. 5 is an illustration of the non-periodic cross-correlation function mentioned in the paper (for code 3 and code 4 in FIG. 1).

It is certified that error appears in the above-identified patent and that said Letters Patent is hereby corrected as shown below:

Title page,
Item [73], OTHER PUBLICATIONS, please replace Assignee with
-- Linkair Communications, Inc. --;

Column 4,
Line 66, change "polrities" to -- polarities --;

Column 5,
Delete lines 1-5 and replace lines 1-5 with the following text:
-- Figure 2 and Figure 3 are non-cylic auto-correlation curves for code 1 and code 2 in Figure 1 respectively. Figure 4 illustrates a non-periodic cross-correlation function for code 1 and code 2 of figure 1. Figure 5 illustrates a non-periodic cross-correlation function for code 3 and code 4 of Figure 1. Cross-correlation between other pairs of codes have quite similar shapes so that side lobes may equal a value chose from +1, -1 of 0. --

Column 6,
Line 6, change "group tha" to -- group that --

Signed and Sealed this

Twenty-eighth Day of October, 2003

JAMES E. ROGAN
*Director of the United States Patent and Trademark Office*